(12) United States Patent
Irby et al.

(10) Patent No.: US 10,395,463 B2
(45) Date of Patent: Aug. 27, 2019

(54) PRODUCT DEFINITION SYSTEM

(75) Inventors: Cindy Irby, Charlotte, NC (US);
Maxine Campbell, Edisto Island, SC (US); Greg Verego, Charlotte, NC (US); Shannon Chavis-Smith, Charlotte, NC (US)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 1074 days.

(21) Appl. No.: 11/226,653

(22) Filed: Sep. 13, 2005

(65) Prior Publication Data
US 2006/0089849 A1     Apr. 27, 2006

Related U.S. Application Data

(60) Provisional application No. 60/609,625, filed on Sep. 14, 2004, provisional application No. 60/609,858, filed on Sep. 14, 2004.

(51) Int. Cl.
G07F 9/02     (2006.01)
G06Q 30/00    (2012.01)
G06Q 30/02    (2012.01)

(52) U.S. Cl.
CPC .............. G07F 9/02 (2013.01); G06Q 30/00 (2013.01); G06Q 30/0207 (2013.01); G06Q 30/0283 (2013.01)

(58) Field of Classification Search
CPC ...... G07F 9/02; G06Q 30/00; G06Q 30/0207; G06Q 30/0283

USPC ......................................................... 705/400
See application file for complete search history.

(56) References Cited

U.S. PATENT DOCUMENTS

| | | | |
|---|---|---|---|
| 5,873,069 A * | 2/1999 | Reuhl et al. .................... 705/20 |
| 6,175,831 B1 | 1/2001 | Weinreich et al. | |
| 6,289,322 B1 * | 9/2001 | Kitchen et al. ................. 705/40 |
| 6,449,627 B1 * | 9/2002 | Baer et al. ..................... 715/206 |
| 6,484,150 B1 | 11/2002 | Blinn et al. | |
| 6,604,107 B1 | 8/2003 | Wang | |
| 6,898,711 B1 * | 5/2005 | Bauman et al. .............. 713/185 |
| 2001/0049653 A1 * | 12/2001 | Sheets ............................. 705/38 |
| 2002/0027567 A1 * | 3/2002 | Niamir .......................... 345/738 |
| 2003/0023538 A1 * | 1/2003 | Das et al. ....................... 705/37 |
| 2003/0115204 A1 | 6/2003 | Greenblatt et al. | |
| 2003/0115246 A1 | 6/2003 | Mahon et al. | |
| 2004/0110486 A1 * | 6/2004 | Sobel ............................ 455/405 |

OTHER PUBLICATIONS

"Neater Cities A Sign of the Times" Miami Herald Dec. 8, 1985. Beverly Hills Herad Staff Writer; p. 1BR.*
McKay et al, "Relating Product Definition and Product Variety"; Research in Engineering Design (1996) 2, 63-80. (Year: 1996).*

* cited by examiner

*Primary Examiner* — Kevin H Flynn
*Assistant Examiner* — Emmett K. Walsh
(74) *Attorney, Agent, or Firm* — Zilka-Kotab, P.C.

(57) ABSTRACT

A data processing system defines products that a service provider may offer to customers. A completed product definition may include product definitions, price definitions, discount definitions, and commitment definitions. Each of the definitions may be employed as a re-useable component building block for establishing completed product definitions.

4 Claims, 7 Drawing Sheets

PRODUCT DEFINITION SYSTEM

PRIORITY CLAIM

This application claims the benefit of U.S. Provisional Application Ser. No. 60/609,625, filed Sep. 14, 2004 and U.S. Provisional Application Ser. No. 60/609,858, filed Sep. 14, 2004, both of which are entirely incorporated herein by reference.

BACKGROUND

Technical Field

This invention relates to data processing systems that define product offerings for a customer. In particular, this invention relates to a flexible building block system for defining and modifying the products that a service provider offers to a customer.

Background Information

Past approaches to determining what products were available to a customer relied upon inflexible hardcoded processing steps, databases, and other data structures. While the product definition database might have statically defined the products that were available at the time that the database was created, its hardcoded nature made the product definitions inflexible and often inaccurate as time went by. Expensive and time consuming re-programming processes ensued through which a software vendor manually updated the databases and programs to suit ever-changing product availabilities for service providers such as the cable TV industry.

Even if a service provider was willing to incur the re-programming expense and delay, there were other drawbacks. With every custom system release came the need for individuals to track, understand, and support the system. The past approaches increased the costs for the software and system vendor as well as the service provider and also complicated the introduction of new products, pricings, and discounts for service provider customers.

A need has long existed for addressing the problems noted above and others previously experienced.

BRIEF SUMMARY

A service provider may employ a data processing system to define products that the service provider may offer to customers. A completed product definition may include one or more product instance identifiers, price instance identifiers, discount instance identifiers, and commitment instance identifiers. Each of the identifiers may reference a corresponding product, price, discount, or commitment definition which is employed as a re-useable component building block for establishing the completed product definitions. The definitions are highly configurable and may be adapted to meet the needs of the cable or satellite television industry, telephone industry, or other industries.

In one implementation, a data processing system establishes product definitions, price definitions, discount definitions, and commitment definitions. The data processing system may then associate one or more of the definitions with other definitions to form one or more completed product definitions. Any instance of a product definition, price definition, discount definition, or commitment definition may be re-used between completed product definitions.

The details of one or more implementations of the invention are set forth below and in the accompanying drawings.

Other aspects of the invention will be apparent from the description below, including the claims.

DETAILED DESCRIPTION

Figure 1:
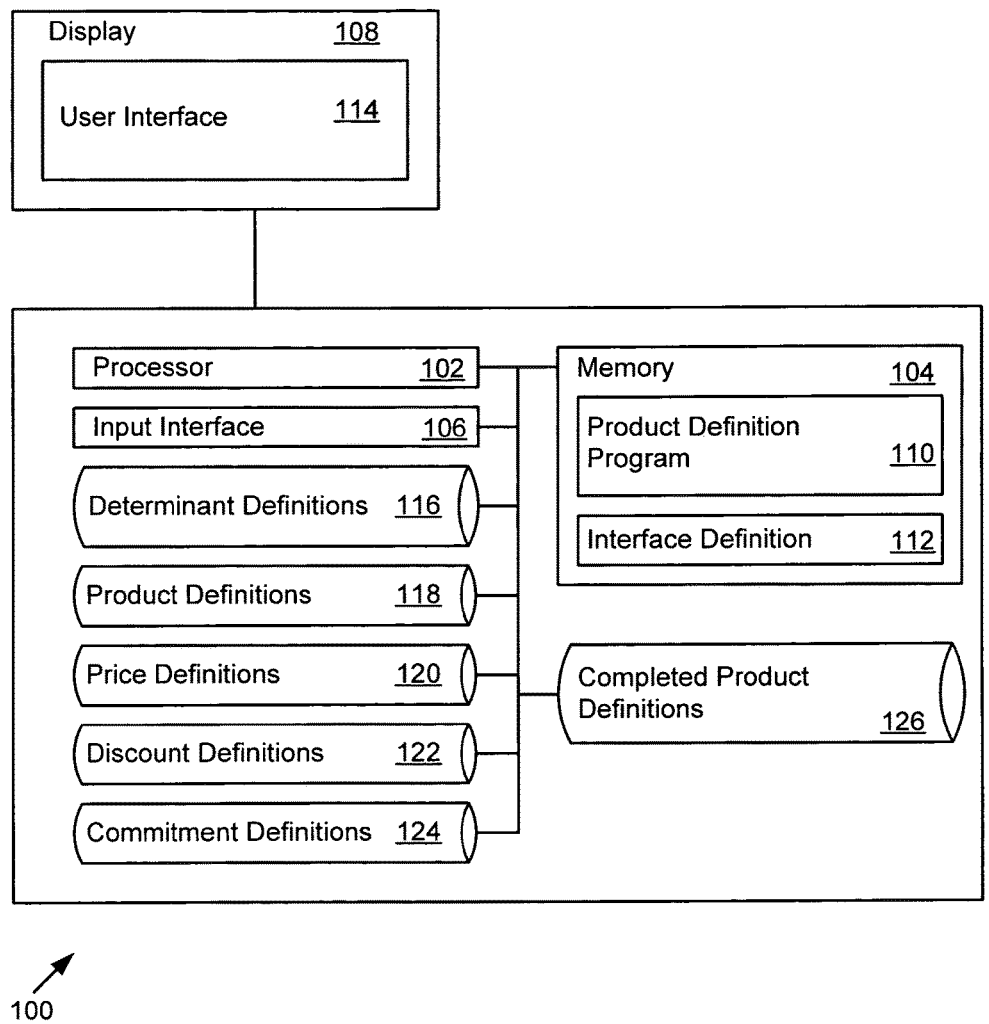
FIG. 1 is an example of a product definition data processing system.

In FIG. 1, a data processing system 100 may include a processor 102, a memory 104, an input interface 106, and a display 108. The memory 104 may store a product definition program 110 and a user interface definition 112 for the user interface 114. The data processing system 100 may also include databases or data structures that provide determinant definitions 116 (including product availability determinant definitions and price structure determinant definitions), product definitions 118, price definitions 120, discount definitions 122, and commitment definitions 124. As will be explained in more detail below, the definitions 116-124 may be associated with one another to form completed product definitions 126.

The determinant definitions 116 may be established and associated with product structures and price structures as described in the U.S. Provisional Pat. App. titled "Product and Price Determination System", filed Sep. 14, 2004, Ser. No. 60/609,625, and incorporated herein by reference in its entirety.

The elements illustrated in FIG. 1 interoperate as explained in more detail below. Before setting forth any additional explanation it is noted that all of the discussion below, regardless of the particular implementation being described, is exemplary in nature, rather than limiting. Although selected aspects, features, or components of the implementations are depicted as being stored in memory and in databases, all or part of systems and methods consistent with this invention may be stored on or read from other machine-readable media including secondary storage devices such as hard disks, floppy disks, and CD-ROMs; a received signal; or other forms of machine readable memory either currently known or later developed.

Although for discussion purposes specific components of a data processing system will be described, methods, systems, and articles of manufacture consistent with the invention may include additional or substitute different components. A processor may be a microprocessor, microcontroller, application specific integrated circuit (ASIC), discrete logic, or a combination of other types of circuits acting as explained below. A memory may be Dynamic Random Access Memory (DRAM), Static Random Access Memory (SRAM), Flash or any other type of memory. A database may be separately or remotely stored and managed, split into multiple databases, and generally logically or physically organized in many different ways. Programs may be parts, functions, or subroutines of a single program, separate programs, program libraries, or distributed across several memories and processors either locally or remotely.

The completed product definition 126 may represent products available from a service provider to a customer. For example, in the cable TV industry, the completed product definitions 126 may represent pay-per-view events available to a customer. Completed product definitions 126 may be assembled using instances of the definitions 116-124 as re-useable building blocks. A service provider may create any number of instances of any of the definitions 116-124. The definitions 116-124 may be tailored for any particular service provider in any particular industry, including the cable or satellite television industry, the cellular or landline telephone industry, the publishing industry, or other industries.

The product definition program 110 may associate instances of the definitions 116-124 with one another to form the completed product definitions 126. In one implementation, the product definition program 110 may associate definitions 116-124 with one another through identifier fields in database tables. The product definition program 110 may form an association table or reference table with one or more identifiers of any one or more of a product definition instance, a price definition instance, a discount definition instance, and a commitment definition instance to form a completed product definition.

Figure 2:
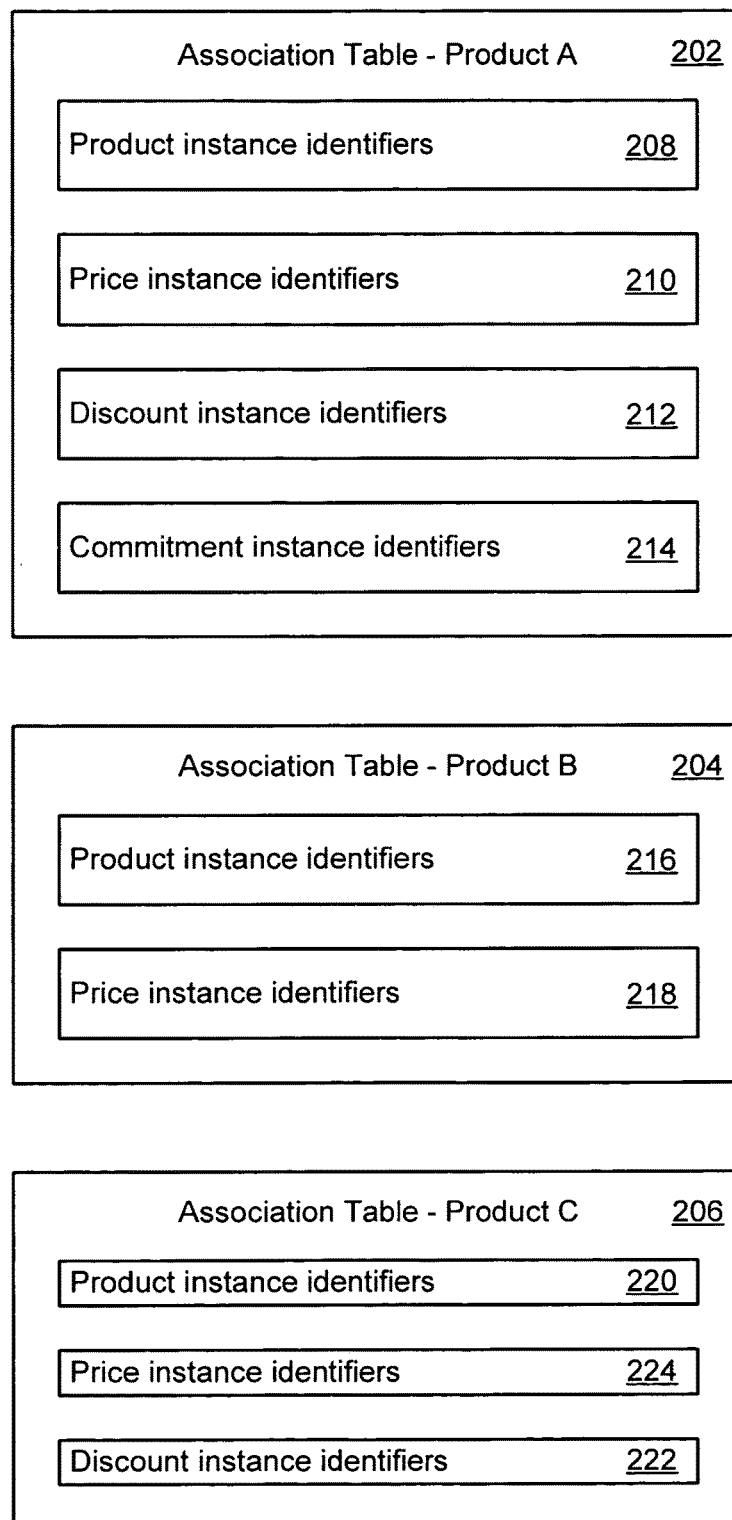
FIG. 2 is an example of an association table that establishes a completed product definition.

In FIG. 2, three association tables 202, 204, and 206 are present. The association tables 202-206 may be formed in a relational database or with other data structures supported by any suitable programming language or programming environment. The association table 202 establishes a completed product definition for Product A. The association table 204 establishes a completed product definition for Product B. The association table 206 establishes a completed product definition for Product C.

For a completed product definition, any association table may include a product instance identifier, may include a price instance identifier, may include a discount instance identifier, and/or may include a commitment instance identifier. A completed product definition may include any combination of product definitions, price definitions, discount definitions, and commitment definitions. The association table 202 for Product A includes a product instance identifier 208, a price instance identifier 210, a discount instance identifier 212, and a commitment instance identifier 214 to establish a product with a price, an available discount, and a required commitment. The association table 204 for Product B includes a product instance identifier 216 and a price instance identifier 218 to establish a product with a price. The association table for Product C includes a product instance identifier 220, a discount instance identifier 222, and a price instance identifier 224 to establish a product with a price and a discount.

The instance identifiers 208-224 may specify any instance of the product definitions 118, price definitions 120, discount definitions 122, and commitment definitions 124. The same instance of any of the definitions 118-124 may be re-used between products definitions. For example, Product A and Product C may share the same discount. The association tables 202 and 206 may then specify the same identifier for the commitment instance identifier 214.

Figure 3:
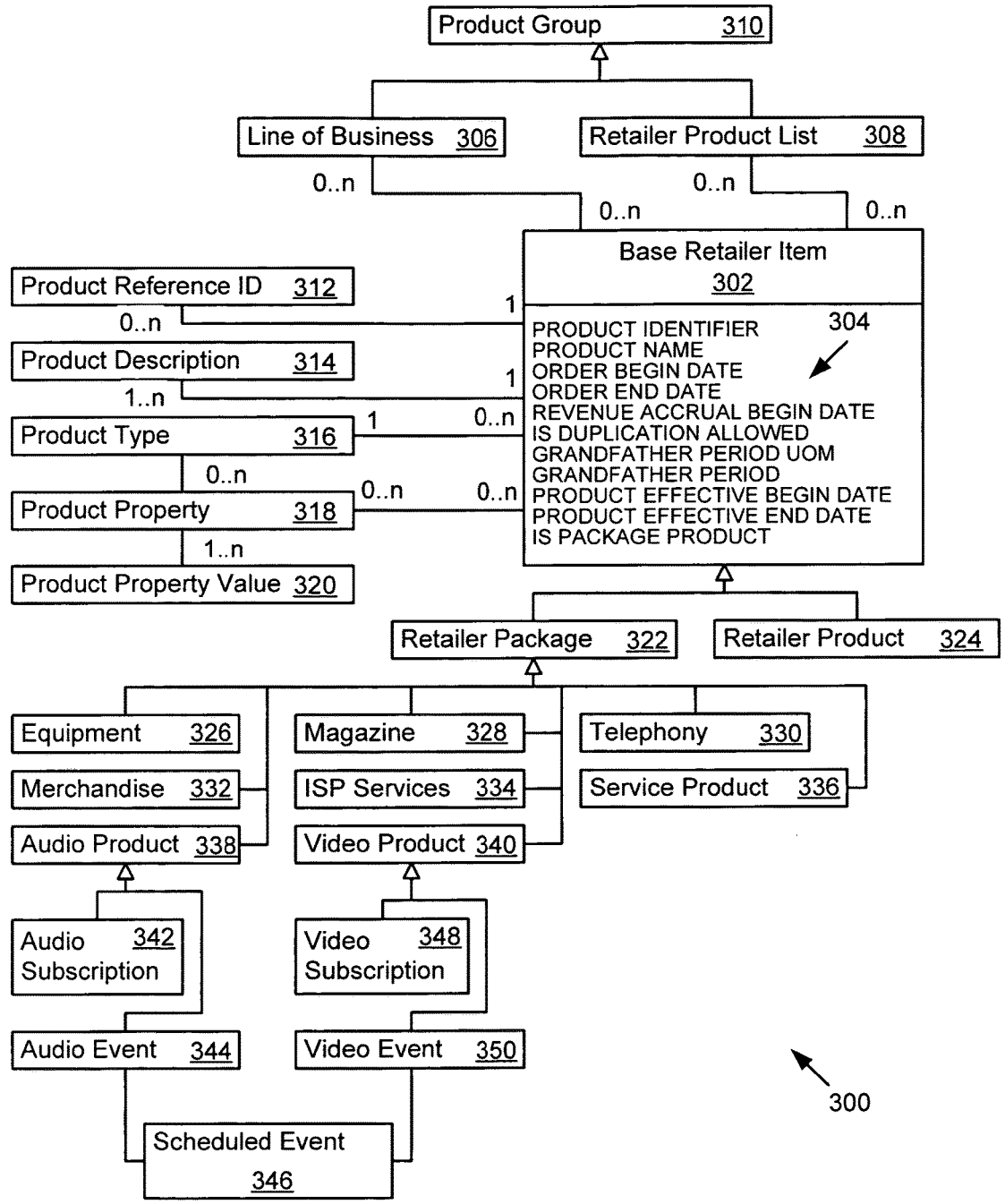
FIG. 3 are examples of product definitions.

In FIG. 3, exemplary product definitions 300 are present, including a base retailer definition 302. The base retailer definition 302 may encapsulate data or other information 304 common across multiple products, service providers, and customers. FIG. 3 also shows examples of other product definitions that may be established in the data processing system 100, and that may be associated with one another to further define a base retailer definition 302.

FIG. 3 shows a retailer line of business definition 306, a retailer product list 308, and a product group definition 310. FIG. 3 also shows a product reference ID definition 312, a product description definition 314, a product type definition 316, a product property definition 318, and a product property value definition 320. Other product definitions include a retailer package definition 322 and a retailer product definition 324.

Product definitions may be established for one or more categories of products supported by the system 100. FIG. 3 shows examples of product definitions for several categories, including an equipment definition 326, a magazine definition 328, and a telephony definition 330. Additional categories are supported by a merchandise definition 332, an internet service provider services definition 334, and a service product definition 336. An audio product definition 338 and a video product definition 340 may also be established.

An audio product may be associated with an audio subscription definition 342, an audio event definition 344, and a scheduled event definition 346. Similarly, a video product may be associated with a video description definition 348, a video event definition 350, and the scheduled event definition 346.

Each definition 302, 306-350 may include data underlying the role played by the definition. Exemplary implementations of the definitions will be discussed below. In addition, instance of the definitions may be associated with one another as shown in FIG. 3. For example, anywhere from zero to 'n' instances of a product property definition 318 may be associated with a base retailer item 302. As another example, a given instance of a base retailer definition 302 may be associated with one instance of a product type definition 316. The associations shown in FIG. 3 are exemplary only and may vary substantially between implementations.

One example of a database table implementation for the base retailer definition 302 is shown below in Table 1a. In Table 1, a primary key or portion of a concatenated primary key is marked with a '#' in the Key column. Table 1 shows each database field (e.g., "PRICE_ID"), its preferred content (e.g., whether the field may be Null, or is preferably Not Null), and its type (e.g., Numeric).

TABLE 1a

Base Retailer Item

| Key | Column | Content | Type |
|---|---|---|---|
| # | PRODUCT IDENTIFIER | NOT NULL | Identifier |
| | PRODUCT NAME | NOT NULL | String |
| | ORDER BEGIN DATE | NOT NULL | Date |
| | ORDER END DATE | NULL | Date |
| | REVENUE ACCRUAL BEING DATE | NOT NULL | Date |
| | IS DUPLICATION ALLOWED | NULL | Boolean |
| | GRANDFATHER PERIOD UOM | NULL | Enumeration |
| | GRANDFATHER PERIOD | NULL | Numeric |
| | PRODUCT EFFECTIVE BEGIN DATE | NOT NULL | Date |
| | PRODUCT EFFECTIVE END DATE | NULL | Date |
| | IS PACKAGE PRODUCT | NULL | Boolean |

The PRODUCT IDENTIFIER field may provide a primary key and may specify a unique integer, string, or alphanumeric field (an "identifier") that identifies an instance of a base retailer product. The PRODUCT NAME field may provide an alphanumeric descriptor of the product and may designate or distinguish one product from another. The ORDER BEGIN DATE field may establish a date and/or time when the service provider may take a customer request for a product. In one implementation, when the ORDER BEGIN DATE is before the date when service actually begins, the product may be considered available for pre-order. The ORDER END DATE may specify when a customer may no longer place an order for an item.

The REVENUE ACCRUAL BEGIN DATE may establish a date and/or time when the service provider may earn revenue from the sale of the product. The IS DUPLICATION ALLOWED field may be a flag that indicates whether a customer may purchase multiple units of the product, such as for merchandise or equipment purchasing. The GRANDFATHER PERIOD field may establish a span of time after the product expires during which a customer may continue to have the product. In one implementation, when the PRODUCT EFFECTIVE END DATE is updated, the GRANDFATHER PERIOD and GRANDFATHER PERIOD UOM fields may be added to allow for a period of continued customer ownership. The GRANDFATHER PERIOD UOM may establish a unit of measure for the GRANDFATHER PERIOD. The unit or measure may represent a code, acronym, name, or other identifier of a quantity in which a duration may be measured (e.g., days, months, or years).

The PRODUCT EFFECTIVE BEGIN DATE may specify a date when the service provider may first deliver or broadcast a product. The PRODUCT EFFECTIVE END DATE may specify the last date that the service provider may deliver or broadcast a product. The IS PACKAGED PRODUCT field may represent a flag or other indicator that the product is part of a larger package, and not an individual service provider product.

In another implementation, the base retailer definition 302 may be established as a product definition linked to a retailer item definition by a foreign key. An example of each is present in Tables 1b and 1c.

TABLE 1b

PRODUCT

| Key | Column | Content | Type |
|---|---|---|---|
| # | PRODCT_ID | NOT NULL | Numeric |
|  | PRODUCT_NAME | NOT NULL | String |
|  | PRDTYP_ID | NOT NULL | Numeric |
|  | IS_PACKAGE_FLG | NOT NULL | Numeric |
|  | CREATED_BY | NOT NULL | String |
|  | CREATED_DT | NOT NULL | Date |
|  | MODIFIED_BY | NOT NULL | String |
|  | MODIFIED_DT | NOT NULL | Date |
|  | IS_DUPLICATE_ALLOWED_FLG | NULL | Numeric |
|  | MANUAL_PRODUCT_ID | NULL | String |
|  | ORDER_BEGIN_DT | NOT NULL | Date |
|  | ORDER_END_DT | NULL | Date |
|  | EFFECTIVE_BEGIN_DT | NOT NULL | Date |
|  | EFFECTIVE_END_DT | NULL | Date |
|  | GRANDFATHER_PERIOD | NULL | Numeric |
|  | GRANDFATHER_UOMMES_ID | NULL | Numeric |
|  | PRNRTG_ID | NULL | Numeric |
|  | REVENUE_ACCRU_BEGIN_DT | NOT NULL | Date |

The PRODCT_ID field may provide an identifier of an instance of the product definition shown in Table 1b. The PRDTYP_ID may provide an identifier that specifies an instance of a product type definition 316. The CREATED_BY and CREATED_DT fields may provide an alphanumeric descriptor and a date for the person or process that created the instance of the product definition, and the date of creation, respectively. The MODIFIED_BY and MODIFIED_DT fields may provide an alphanumeric descriptor and a date for the person or process that last modified the instance of the product definition, and the date of modification, respectively.

The MANUAL_PRODUCT_ID field may provide an alphanumeric descriptor of a manually set product identifier in addition to that provided by the PRODCT_ID field. The PRNRTG_ID field may provide a parental rating identifier which provides a descriptor of a category of video products by assigning the product a position on a rating scale.

TABLE 1c

RETAILER_ITEM

| Key | Column | Content | Type |
|---|---|---|---|
| # | PRODCT_ID | NOT NULL | Numeric |
| # | PRC_RET_ID | NOT NULL | Numeric |
|  | IS_COMPLETE_FLG | NOT NULL | Numeric |
|  | MODIFIED_BY | NOT NULL | String |
|  | MODIFIED_DT | NOT NULL | Date |
|  | DISPLAY_RANK | NULL | Numeric |

The PRC_RET_ID field may provide an identifier of an instance of the RETAILER_ITEM table. The IS_COMPLETE_FLG may provide a code that indicates whether a product associated with the RETAILER_ITEM table is complete. The data processing system 100 may determine whether the product is complete by analyzing one or more database table fields to determine if they meet established criteria, such as defining entries that may be NOT NULL, that dates, prices, times, or other data is provided, and may check any other criteria established to determine when a product definition is complete. The DISPLAY_RANK may provide a numeric code indicating a display order or display priority for the product associated with the retailer item table. The data processing system 100 may then display products to the customer according to their display ranks.

Table 2 shows an example of a database implementation for the line of business definition 306.

TABLE 2

Line of Business

| Key | Column | Content | Type |
|---|---|---|---|
| # | Product Group Identifier | NULL | Identifier |
|  | Product Group Name | NULL | String |

The line of business definition 306 may provide a category to group products according to a service provider's commercial enterprise. The Product Group Identifier may provide an identifier of an instance of a Product Group definition. The Product Group Name may provide an alphanumeric descriptor such as a word or a phrase that distinguishes one Product Group from another.

Table 3 shows an example of a database implementation for the retailer product list definition 308.

TABLE 3

Retailer Product List

| Key | Column | Content | Type |
|---|---|---|---|
| # | Product Group Identifier | NOT NULL | Identifier |
|  | Product Group Name | NOT NULL | String |
|  | Retailer Price Begin Date | NOT NULL | Date |
|  | Retailer Price End Date | NULL | Date |

The retailer product list definition 308 may establish a set of products that extend across multiple Lines of Business, and may represent all of the products that a given service provider may sell. The Retailer Price Begin Date may represent a point in time when a service provider began to sell or offer a specific product at a specific price. The Retailer Price End Date may represent a point in time when a service provider ceased to sell a specific product at a specific price.

Table 4 shows an example of a database implementation for the product group definition 310.

TABLE 4

Product Group Definition

| Key | Column | Content | Type |
|---|---|---|---|
| # | Product Group Identifier | NOT NULL | Identifier |
|  | Product Group Name | NOT NULL | String |

The product group definition 310 may establish a number of individual products considered together because of their similarities. There may be a Line of Business group, a Product Line group, or other groups. A product may be in multiple groups. The Line of Business and Product Line groups may establish overlapping subsets of products through which a service provider may categorize their products in multiple flexible ways.

Table 5 shows an example of a database implementation for the product reference ID definition 312.

TABLE 5

Product Reference ID

| Key | Column | Content | Type |
|---|---|---|---|
|  | Product Reference ID | NULL | Identifier |
|  | Product Reference Value | NULL | String |

The product reference ID definition 312 may establish an identifier used in other systems to reference a product offered by another service provider. The reference identifier may specify both the identifier as it is used in a system external to a service provider and the external service provider itself.

The Product Reference ID may provide an identifier used in other systems to reference the associated Base Retailer Item. The Product Reference Value may provide an Identifier used in other systems to reference the associated Base Retailer Item and its value in the external system.

Table 6 shows an example of a database implementation for the product description definition 314.

TABLE 6

Product Description

| Key | Column | Content | Type |
|---|---|---|---|
|  | Description | NOT NULL | String |
|  | Description Identifier | NOT NULL | Identifier |
|  | Is Default | NULL | Boolean |

The product description definition 314 may establish additional descriptive information for a Product. A product description may take many forms, including graphical icons, text, videos or images.

The Description may provide words or phrases that convey a product description. The Description Identifier may provide an identifier of an instance of a product description definition. The Is Default field may provide a code, flag or Boolean expression indicating that the product description is or is not a default description. The default description may be used when a service provider defines more than one type of description for a product and one description will be designated as the default description to be returned when a specific description type has not been requested.

Table 7 shows an example of a database implementation for the product type definition 316.

TABLE 7

Product Type

| Key | Column | Content | Type |
|---|---|---|---|
|  | PRDTYP_ID | NOT NULL | ProductTypeOpenEnum |
|  | PRODUCT_TYPE_NAME | NOT NULL | String |
|  | CREATED_BY | NOT NULL | String |
|  | CREATED_DATE | NOT NULL | String |

The product type definition 316 may establish a category of products, e.g., Equipment, Telephony, ISP, Video, Audio, General Merchandise, or other categories. The PRDTYP_ID may provide an identifier of an instance of a product type definition. The PRODUCT_TYPE_NAME may provide an alphanumeric descriptor of the Product Type.

Table 8 shows an example of a database implementation for the product property definition 318.

TABLE 8

Product Property

| Key | Column | Content | Type |
|---|---|---|---|
|  | Product Property ID | NULL | Identifier |
|  | Product Property Name | NULL | String |

The product property definition 318 may establish a characteristic, trait or distinction possessed by members of a Product but which is not part of the standard product definition attributes. The Product Property ID may provide an identifier of an instance of a product property definition. The Product Property Name may provide an alphanumeric descriptor of the product property.

Table 9 shows an example of a database implementation for the product property value definition 320.

TABLE 9

Product Property Value Definition

| Key | Column | Content | Type |
|---|---|---|---|
|  | Is Default | NULL | Boolean |
|  | Product Property Value Identifier | NULL | Identifier |
|  | Product Property Value | NULL | String |

The property value definition 320 may establish a discrete unit of value for a product property. The Is Default field may indicate whether a given instance of the definition 320 provides the value that may be automatically assigned by the system 100 when there is no other value specified. The Product Property Value Identifier may provide an identifier of an instance of the product property value definition. The Product Property Value may provide a value for the Product Property.

Table 10 shows an example of a database implementation for the retailer package definition 322.

TABLE 10

Retailer Package Definition

| Key | Column | Content | Type |
|---|---|---|---|
|  | Grandfather Period | NULL | Integer |
|  | Grandfather Period UOM | NULL | Duration UOM Open Enum |
|  | Is Duplication Allowed | NULL | Boolean |
|  | Is Package Product | NOT NULL | Boolean |
|  | Order Begin Date | NOT NULL | Date |
|  | Order End Date | NULL | Date |
|  | Product Effective Begin Date | NOT NULL | Date |
|  | Product Effective End Date | NULL | Date |
|  | Product Identifier | NOT NULL | Identifier |
|  | Product Name | NOT NULL | String |
|  | Revenue Accrual Begin Date | NOT NULL | Date |
|  | Total Package Price | NULL | Numeric |

The retailer package definition 322 may establish a product package as a group of retailer products presented as a single unit for sale and distribution. A product package may include other product packages.

The Grandfather Period may provide the span of time expressed in units (quantity) after the product expires when the customer may continue to have the product. When the Product Effective End Date is updated a Grandfather Period and Period UOM may be added to allow for a period of continued customer ownership. The Grandfather Period UOM may provide the unit of measure for the Grandfather period. It may be a code, acronym, or name of a quantity in which Duration is measured, e.g., day, month, year.

The Is Duplication Allowed field may provide a flag or Boolean expression indicating whether a customer may purchase multiple of the same product. The Is Package Product field may provide a Boolean indicator used to identify the product as a package product, as opposed to an individual retailer product, for example. The Order Begin Date may establish when a request for a product may be taken. When an Order Begin Date comes before Service Begin Date, preordering may occur.

The Order End Date may establish when a customer request for a product may no longer be taken. The Product Effective Begin Date may be a calendar date in month, day and year format representing the first date a product is available for sale. The Product Effective End Date may provide a calendar date in month, day and year format representing the last date a product is available for sale.

The Revenue Accrual Begin Date may establish when revenue can be earned for the sale of a product. The Total Package Price may provide the price for a package product and may be determined by adding up the price value assigned to each individual Retailer Package Product in the package.

Table 11 shows an example of a database implementation for the retailer product definition 324.

TABLE 11

Retailer Product Definition

| Key | Column | Content | Type |
|---|---|---|---|
|  | Grandfather Period | NULL | Integer |
|  | Grandfather Period UOM | NULL | Duration UOM Open Enum |
|  | Is Duplication Allowed | NULL | Boolean |
|  | Is Package Product | NULL | Boolean |
|  | Order Begin Date | NOT NULL | Date |
|  | Order End Date | NULL | Date |
|  | Product Effective Begin Date | NOT NULL | Date |
|  | Product Effective End Date | NULL | Date |
|  | Product Identifier | NOT NULL | Identifier |
|  | Product Name | NOT NULL | String |
|  | Revenue Accrual Begin Date | NOT NULL | Date |

The retailer product definition 324 may establish those products that are offered for sale to the customer. One or more retailer products may be combined to form product packages.

Table 12 shows an example of a database implementation for the equipment definition 326.

TABLE 12

Equipment Definition

| Key | Column | Content | Type |
|---|---|---|---|
|  | Grandfather Period | NULL | Integer |
|  | Grandfather Period UOM | NULL | Duration UOM Open Enum |
|  | Is Duplication Allowed | NULL | Boolean |
|  | Is Package Product | NULL | Boolean |
|  | Manufacturer | NOT NULL | String |
|  | Merchandise Color | NULL | ColorOpenEnum |
|  | Merchandise Size | NULL | String |
|  | Model Number | NOT NULL | Date |
|  | Order Begin Date | NOT NULL | Date |
|  | Order End Date | NULL | Date |
|  | Product Effective Begin Date | NOT NULL | Date |
|  | Product Effective End Date | NULL | Date |
|  | Product Identifier | NOT NULL | Identifier |
|  | Product Name | NOT NULL | String |
|  | Revenue Accrual Begin Date | NOT NULL | Date |
|  | SKU | NOT NULL | Byte |

The equipment definition 326 may establish the electrical, mechanical, digital, or other machinery that can be sold as a product. Examples of equipment include cell phones, set-top boxes and caller-id boxes.

The Manufacturer field may provide an alphanumeric descriptor of a person or enterprise that fabricates or assembles finished goods. The Merchandise Color field may provide a hue, shade or brightness of a product. The Merchandise Size may provide one of a series of graduated dimensions which classifies manufactured goods. The Model Number may provide the combination of letters and numbers that identify the equipment. The SKU field may provide an identifier established by the manufacturer to name the product.

Table 13 shows an example of a database implementation for the magazine definition 328.

TABLE 13

Magazine Definition

| Key | Column | Content | Type |
|---|---|---|---|
|  | Grandfather Period |  | Integer |
|  | Grandfather Period UOM |  | Duration UOM Open Enum |
|  | Is Duplication Allowed |  | Boolean |
|  | Is Package Product |  | Boolean |
|  | Order Begin Date |  | Date |
|  | Order End Date |  | Date |
|  | Product Effective Begin Date |  | Date |
|  | Product Effective Begin Date |  | Date |
|  | Product Effective End Date |  | Date |
|  | Product Identifier |  | Identifier |
|  | Product Name |  | String |
|  | Revenue Accrual Begin Date |  | Date |

The magazine definition 328 may establish a periodical containing articles, stories pictures, including a magazine be designed as a guide to the video or audio programming schedule.

Table 13 shows an example of a database implementation for the telephone definition 330.

TABLE 13

Telephony

| Key | Column | Content | Type |
|---|---|---|---|
|  | Grandfather Period | NULL | Integer |
|  | Grandfather Period UOM | NULL | Duration UOM Open Enum |
|  | Is Duplication Allowed | NULL | Boolean |
|  | Is Package Product | NULL | Boolean |
|  | Order Begin Date | NOT NULL | Date Time |
|  | Order End Date | NULL | Date Time |
|  | Product Effective Begin Date | NOT NULL | Date |
|  | Product Effective End Date | NULL | Date |
|  | Product Identifier | NOT NULL | Identifier |
|  | Product Name | NOT NULL | String |
|  | Revenue Accrual Begin Date | NOT NULL | Date Time |

The telephone definition 330 may establish phone service products.

Table 14 shows an example of a database implementation for the merchandise definition 332.

TABLE 14

Merchandise Definition

| Key | Column | Content | Type |
|---|---|---|---|
|  | Grandfather Period | NULL | Integer |
|  | Grandfather Period UOM | NULL | Duration UOM Open Enum |
|  | Is Duplication Allowed | NULL | Boolean |
|  | Is Package Product | NULL | Boolean |
|  | Manufacturer | NOT NULL | String |
|  | Merchandise Color | NULL | ColorOpenEnum |
|  | Merchandise Size | NULL | SizeOpenEnum |
|  | Model Number | NOT NULL | String |
|  | Order Begin Date | NOT NULL | Date Time |
|  | Order End Date | NULL | Date Time |
|  | Product Effective Begin Date | NOT NULL | Date |
|  | Product Effective End Date | NULL | Date |
|  | Product Identifier | NOT NULL | Identifier |
|  | Product Name | NOT NULL | String |

TABLE 14-continued

Merchandise Definition

| Key | Column | Content | Type |
|---|---|---|---|
|  | Revenue Accrual Begin Date | NOT NULL | Date Time |
|  | SKU | NULL | Byte |

The merchandise definition 332 may establish goods bought and sold in business, including clothing, books or tapes, cd-roms, and other goods.

Table 15 shows an example of a database implementation for the internet service provider services definition 334.

TABLE 15

ISP Service Definition

| Key | Column | Content | Type |
|---|---|---|---|
|  | Grandfather Period | NULL | Integer |
|  | Grandfather Period UOM | NULL | Duration UOM Open Enum |
|  | Is Duplication Allowed | NULL | Boolean |
|  | Is Package Product | NULL | Boolean |
|  | Order Begin Date | NOT NULL | Date Time |
|  | Order End Date | NULL | Date Time |
|  | Product Effective Begin Date | NOT NULL | Date |
|  | Product Effective End Date | NULL | Date |
|  | Product Identifier | NOT NULL | Identifier |
|  | Product Name | NOT NULL | String |
|  | Revenue Accrual Begin Date | NOT NULL | Date Time |

The internet service provider services definition 334 may establish internet service products offered by Internet Service Providers.

Table 16 shows an example of a database implementation for the service product definition 336.

TABLE 16

Service Product Definition

| Key | Column | Content | Type |
|---|---|---|---|
|  | Grandfather Period | NULL | Integer |
|  | Grandfather Period UOM | NULL | Duration UOM Open Enum |
|  | Is Duplication Allowed | NULL | Boolean |
|  | Is Package Product | NULL | Boolean |
|  | Order Begin Date | NOT NULL | Date Time |
|  | Order End Date | NULL | Date Time |
|  | Product Effective Begin Date | NOT NULL | Date |
|  | Product Effective End Date | NULL | Date |
|  | Product Identifier | NOT NULL | Identifier |
|  | Product Name | NOT NULL | String |
|  | Revenue Accrual Begin Date | NOT NULL | Date Time |

The service product definition 336 may establish work done for others as an occupation or business, including installation, repair service calls, service agreements, or other types of work.

Table 17 shows an example of a database implementation for the audio product definition 338.

TABLE 17

| Audio Product Definition | | | |
|---|---|---|---|
| Key | Column | Content | Type |
| | Grandfather Period | NULL | Integer |
| | Grandfather Period UOM | NULL | Duration UOM Open Enum |
| | Is Duplication Allowed | NULL | Boolean |
| | Is Package Product | NULL | Boolean |
| | Order Begin Date | NOT NULL | Date Time |
| | Order End Date | NULL | Date Time |
| | Product Effective Begin Date | NOT NULL | Date |
| | Product Effective End Date | NULL | Date |
| | Product Identifier | NOT NULL | Identifier |
| | Product Name | NOT NULL | String |
| | Revenue Accrual Begin Date | NOT NULL | Date Time |

The audio product definition 338 may establish a product offered by the broadcast industry. The product may be a monthly subscription product, a one-time broadcast of an entertainment event, or another product.

Table 18 shows an example of a database implementation for the video product definition 340.

TABLE 18

| Video Product Definition | | | |
|---|---|---|---|
| Key | Column | Content | Type |
| | Grandfather Period | NULL | Integer |
| | Grandfather Period UOM | NULL | Duration UOM Open Enum |
| | Is Duplication Allowed | NULL | Boolean |
| | Is Mirroring Allowed | NOT NULL | Boolean |
| | Is Package Product | NULL | Boolean |
| | Order Begin Date | NOT NULL | Date Time |
| | Order End Date | NULL | Date Time |
| | Product Effective Begin Date | NOT NULL | Date |
| | Product Effective End Date | NULL | Date |
| | Product Identifier | NOT NULL | Identifier |
| | Product Name | NOT NULL | String |
| | Revenue Accrual Begin Date | NOT NULL | Date Time |

The video product definition 340 may establish a product offered by the broadcast industry. The product may be a monthly subscription product, a one-time broadcast of an entertainment event including a movie, sporting or special event, or another product.

The Is Mirroring Allowed field may establish whether a Video Product may or may not be duplicated on hardware owned by the customer.

Table 19 shows an example of a database implementation for the audio subscription definition 342.

TABLE 19

| Audio Subscription Product Definition | | | |
|---|---|---|---|
| Key | Column | Content | Type |
| | Grandfather Period | NULL | Integer |
| | Grandfather Period UOM | NULL | Duration UOM Open Enum |
| | Is Duplication Allowed | NULL | Boolean |
| | Is Package Product | NULL | Boolean |
| | Order Begin Date | NOT NULL | Date Time |
| | Order End Date | NULL | Date Time |
| | Product Effective Begin Date | NOT NULL | Date |
| | Product Effective End Date | NULL | Date |
| | Product Identifier | NOT NULL | Identifier |
| | Product Name | NOT NULL | String |
| | Revenue Accrual Begin Date | NOT NULL | Date Time |

The audio subscription definition 342 may establish a product offered by the broadcast industry. The product may be a monthly recurring product that provides access and reception of a set of audio program channels and events.

Table 20 shows an example of a database implementation for the audio event definition 344.

TABLE 20

| Audio Event Product Definition | | | |
|---|---|---|---|
| Key | Column | Content | Type |
| | Grandfather Period | NULL | Integer |
| | Grandfather Period UOM | NULL | Duration UOM Open Enum |
| | Is Duplication Allowed | NULL | Boolean |
| | Is Package Product | NULL | Boolean |
| | Order Begin Date | NOT NULL | Date Time |
| | Order End Date | NULL | Date Time |
| | Product Effective Begin Date | NOT NULL | Date |
| | Product Effective End Date | NULL | Date |
| | Product Identifier | NOT NULL | Identifier |
| | Product Name | NOT NULL | String |
| | Revenue Accrual Begin Date | NOT NULL | Date Time |

The audio event definition 344 may establish a product offered by the broadcast industry. The product may be a one-time broadcast of an entertainment event such as a special radio program, or may be another type of product.

Table 21 shows an example of a database implementation for the scheduled event definition 346.

TABLE 21

| Scheduled Event Definition | | | |
|---|---|---|---|
| Key | Column | Content | Type |
| | Event Duration | NOT NULL | Integer |
| | Event Duration UOM | NOT NULL | EventDurationClosedEnum |
| | Program Channel | NOT NULL | String |
| | Service Begin Date | NOT NULL | Date Time |
| | Service End Date | NULL | Date Time |

The scheduled event definition 346 may establish the dates and times when either a subscription product or a video event product is available. The Event Duration may provide the span of time that the program runs, e.g., 60 minutes or another duration for a pay-per-view event. The Event Duration UOM may provide a code that identifies a unit of time, such as hours, a minute, a second, or another unit of time.

The Program Channel may provide one or more specified frequency bands for the transmission of the event. The Service Begin Date may establish when a Retailer Product is broadcast, activated or turned on. The Service End Date may establish when a Retailer Product is no longer broadcast, activated or turned on.

Table 22 shows an example of a database implementation for the video subscription definition 348.

TABLE 22

| Video Subscription Product Definition | | | |
|---|---|---|---|
| Key | Column | Content | Type |
| | Grandfather Period | NULL | Integer |
| | Grandfather Period UOM | NULL | Duration UOM Open Enum |
| | Is Duplication Allowed | NULL | Boolean |
| | Is Mirroring Allowed | NULL | Boolean |

TABLE 22-continued

Video Subscription Product Definition

| Key | Column | Content | Type |
|---|---|---|---|
| | Is Package Product | NULL | Boolean |
| | Order Begin Date | NOT NULL | Date Time |
| | Order End Date | NULL | Date Time |
| | Product Duration | NULL | Integer |
| | Product Duration UOM | NULL | Duration UOM Closed Enum |
| | Product Effective Begin Date | NOT NULL | Date |
| | Product Effective End Date | NULL | Date |
| | Product Identifier | NOT NULL | Identifier |
| | Product Name | NOT NULL | String |
| | Revenue Accrual Begin Date | NOT NULL | Date Time |

The video subscription definition 348 may establish a product offered by the broadcast industry. The product may be a monthly recurring service that provides access and reception in the home of a set of program channels and events.

The Product Duration may establish the span of time after the customer purchases a Retailer Product that the Retailer Product remains available for the customer to use. The Product Duration may support product expiration based on a customer purchase date. The Product Duration UOM may provide a code that identifies a unit of time such as an hour, minute, day, month, or year for the Product Duration.

Table 23 shows an example of a database implementation for the video event definition 350.

TABLE 23

Video Event Definition

| Key | Column | Content | Type |
|---|---|---|---|
| | Grandfather Period | NULL | Integer |
| | Grandfather Period UOM | NULL | Duration UOM Open Enum |
| | Is All Day Ticket | NULL | Boolean |
| | Is Duplication Allowed | NULL | Boolean |
| | Is Mirroring Allowed | NULL | Boolean |
| | Is Package Product | NULL | Boolean |
| | Order Begin Date | NOT NULL | Date Time |
| | Order End Date | NULL | Date Time |
| | Preview Window time | NULL | Date Time |
| | Product Effective Begin Date | NOT NULL | Date |
| | Product Effective End Date | NULL | Date |
| | Product Identifier | NOT NULL | Identifier |
| | Product Name | NOT NULL | String |
| | Revenue Accrual Begin Date | NOT NULL | Date Time |

The Video Event Definition 350 may establish a product offered by the broadcast industry. The product may be a one-time broadcast of an entertainment event such as a movie, sporting or special event, or another type of product.

The Is All Day Ticket field may provide a Boolean indicator used to identify this Scheduled Event as an All Day Ticket. The purchase of an All Day Ticket may permit the customer to view the same Scheduled Event as many times as desired within the limits of a specified Broadcast Day. The Preview Window Time may provide a length of time for which a customer may preview a Retailer Product.

Figure 4:
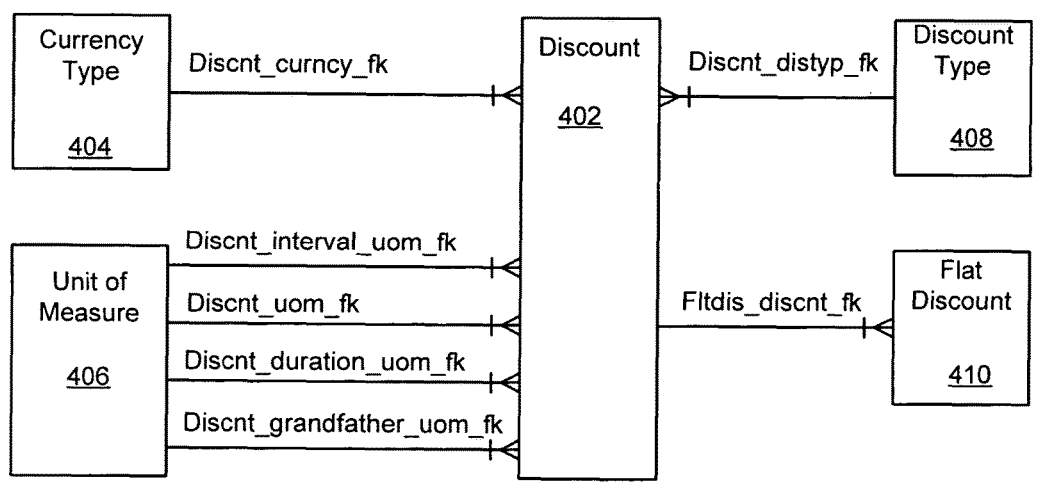
FIG. 4 are examples of discount definitions.

In FIG. 4, exemplary discount definitions 400 are present. The discount definitions 400 may include a discount definition 402, a currency type definition 404, and a unit of measure definition 406. The discount definitions 400 also may include a discount type definition 408 and a flat discount definition 410. Additional discounts based on product type and product price are discussed below with regard to FIG. 6. One or more foreign keys may relate the discount definitions 400 to one another.

The data processing system 100 may employ the discount definitions 400 to implement many different types of discounts. For example, the discount definitions 400 may define a discount on a product price, a discount of a product type price, or a total bill discount. In addition, the discount definitions 400 may establish recurring discount instructions that may apply to a product price discount, a product type price discount, or another type of discount. A product type price discount is a discount on a category of products which are sold at a specific price, for example all video event products (e.g., pay-per-view movies) which are offered for $2.99. The product type price discount eliminates the need to establish an individual product price discount for every individual product (e.g., for many hundreds of movies) which may be offered.

The tables below present exemplary database table implementations of the discount definitions 400.

TABLE 24

CURRENCY_TYPE

| Key | Column | Content | Type |
|---|---|---|---|
| # | CURNCY_ID | NOT NULL | Numeric |
| | CURRENCY_NAME | NOT NULL | String |
| | CURRENCY_DESC100 | NOT NULL | String |
| | LOWEST_DENOM_FACTOR | NOT NULL | Numeric |
| | CREATED_BY | NOT NULL | String |
| | CREATED_DT | NOT NULL | Date |

The CURNCY_ID field may provide a unique identifier of an instance of the currency type definition 404. The CURRENCY_NAME field may provide an alphanumeric name for the currency represented by the instance of the currency type definition 404. The CURRENCY_DESC100 field may provide an alphanumeric descriptor for the currency.

The LOWEST_DENOM_FACTOR field may provide a numeric indicator of the smallest denomination of currency (e.g., 1 cent or 0.01). The CREATED_BY field may provide an alphanumeric descriptor of the person or process that created the instance of the currency type definition 404. The CREATED_DT field may provide a date when the instance of the currency type definition 404 was created.

TABLE 25

UNIT_OF_MEASURE

| Key | Column | Content | Type |
|---|---|---|---|
| # | UOMMES_ID | NOT NULL | Numeric |
| | UOM_NAME | NOT NULL | String |
| | UOM_CATEGORY | NOT NULL | String |
| | UOM_DESC50 | NOT NULL | String |
| | CREATED_BY | NOT NULL | String |
| | CREATED_DT | NOT NULL | Date |

The UOMMES_ID field may provide a unique identifier of an instance of the unit of measure definition 406. The UOM_NAME field may provide an alphanumeric name for the unit of measure applied to the discount. The UOM_CATEGORY field may provide an alphanumeric descriptor of the category to which the unit of measure belongs. The UOM_DESC50 field may provide an alphanumeric descriptor of the unit of measure.

TABLE 26

DISCOUNT

| Key | Column | Content | Type |
|---|---|---|---|
| # | PC_RET_ID | NOT NULL | Numeric |
| # | DISCNT_ID | NOT NULL | Numeric |
|  | DISCOUNT_NAME | NOT NULL | String |
|  | CURNCY_ID | NOT NULL | Numeric |
|  | DITYP_ID | NOT NULL | Numeric |
|  | MODIFIED_BY | NOT NULL | String |
|  | MODIFIED_DT | NOT NULL | Date |
|  | CREATED_BY | NOT NULL | String |
|  | CREATED_DT | NOT NULL | Date |
|  | IS_RECURRING_FLG | NOT NULL | Numeric |
|  | IS_COMPLETE_FLG | NOT NULL | Numeric |
|  | DISCOUNT_DESC100 | NOT NULL | String |
|  | DISCOUNT_UOMMES_ID | NOT NULL | Numeric |
|  | EFFECTIVE_BEGIN_DT | NOT NULL | Date |
|  | EFFECTIVE_END_DT | NULL | Date |
|  | MANUAL_DISCNT_ID | NULL | String |
|  | DISCOUNT_FREQ | NOT NULL | Numeric |
|  | DISCOUNT_DURATION | NOT NULL | Numeric |
|  | DURATION_UOMMES_ID | NOT NULL | Numeric |
|  | DISCOUNT_INTERVAL | NOT NULL | Numeric |
|  | INTERVAL_UOMMES_ID | NOT NULL | Numeric |
|  | MIN_DISCOUNT_AMT | NULL | Numeric |
|  | MAX_DISCOUNT_AMT | NULL | Numeric |
|  | GRANDFATHER_PERIOD | NULL | Numeric |
|  | GRANDFATHER_UOMMES_ID | NULL | Numeric |

The PC_RET_ID field may provide a numeric indicator of a service provider that may have access to the discount structure or a hierarchical definition of service providers that defines permissions to access the discount structure. A service provider with access to the discount structure may then employ the discount structure to define and associate discounts for its products. The DSCNT_ID field may provide a unique identifier for an instance of the discount definition 402. The DISCOUNT_NAME field may provide an alphanumeric name for the discount.

The DITYP_ID field may provide a unique identifier of an instance of a discount type definition 408. The MODIFIED_BY and MODIFIED_DT fields may provide an alphanumeric descriptor and a date indicating the person or process and date when the instance of the discount definition 408 was modified. The IS_RECURRING_FLG field may provide a flag that indicates whether the discount may apply again. The IS_COMPLETE_FLG field may provide a flag that indicates whether the data processing system 100 considers the instance of the discount definition 402 to be complete. Before setting the flag, the data processing system 100 may check any established criteria, for example that the effective begin date is defined, or may check any other test or combination of tests.

The DISCOUNT_DESC100 field may provide an alphanumeric descriptor of the discount represented by the instance of the discount definition 402. The DISCOUNT_UOMMES_ID field may provide an identifier of an associated instance of a unit of measure definition 406. The EFFECTIVE_BEGIN_DT and EFFECTIVE_END_DT may provide a date on which the discount begins and ends.

The MANUAL_DISCNT_ID field may provide a user with the ability to manually define or specify a unique identifier for the discount under construction which will serve as the primary key and which may be used to associate with product prices. The DISCOUNT_FREQ field may provide a code that indicates how frequently the instance of the discount definition 402 applies to an associated product. The DISCOUNT_DURATION field may provide a code that indicates the length of time that the discount remains good for the associated product. The DURATION_UOMMES_ID field may provide a unit of measure applicable to the discount duration (e.g., hours or days). The DISCOUNT_INTERVAL field may provide a code that indicates an interval at which the discount is offered. The INTERVAL_UOMMES_ID field may provide a code that indicates the unit of measure for the discount interval.

The MIN_DISCOUNT_AMT field may provide a code that indicates the minimum amount that the discount may yield. The MAX_DISCOUNT_AMT field may provide a code that indicates the maximum amount that the discount may yield. The GRANDFATHER_PERIOD may provide a code that indicates how long a discount may continue to apply to existing customers after the discount is no longer available to new customers. The GRANFATHER_UOMMES_ID may provide a code that indicates the unit of measure for the grandfather period.

TABLE 27

DISCOUNT_TYPE

| Key | Column | Content | Type |
|---|---|---|---|
| # | DITYP_ID | NOT NULL | Numeric |
|  | DISCOUNT_TYPE_NAME | NOT NULL | String |
|  | DISCOUNT_TYPE_DESC100 | NOT NULL | String |
|  | CREATED_BY | NOT NULL | String |
|  | CREATED_DT | NOT NULL | Date |

The DITYP_ID field may provide a unique identifier of an instance of a discount type definition 408. The DISCOUNT_TYPE_NAME field may provide an alphanumeric name for the discount type. The DISCOUNT_TYPE_DESC100 field may provide an alphanumeric descriptor for the discount type.

TABLE 28

FLAT_DISCOUNT

| Key | Column | Content | Type |
|---|---|---|---|
| # | PC_RET_ID | NOT NULL | Numeric |
| # | DISCNT_ID | NOT NULL | Numeric |
|  | DISCOUNT_AMT | NOT NULL | Numeric |
|  | IS_PERCENTAGE_FLG | NOT NULL | Numeric |
|  | MODIFIED_BY | NOT NULL | String |
|  | MODIFIED_DT | Not Null | Date |

The DISCNT_ID field may provide a unique identifier for an instance of the flat discount definition 410. The DISCOUNT_AMT may provide a numeric code indicating amount of the discount. The IS_PERCENTAGE_FLG field may provide a flag that indicates whether the discount amount is to be treated as a percentage.

Figure 5:
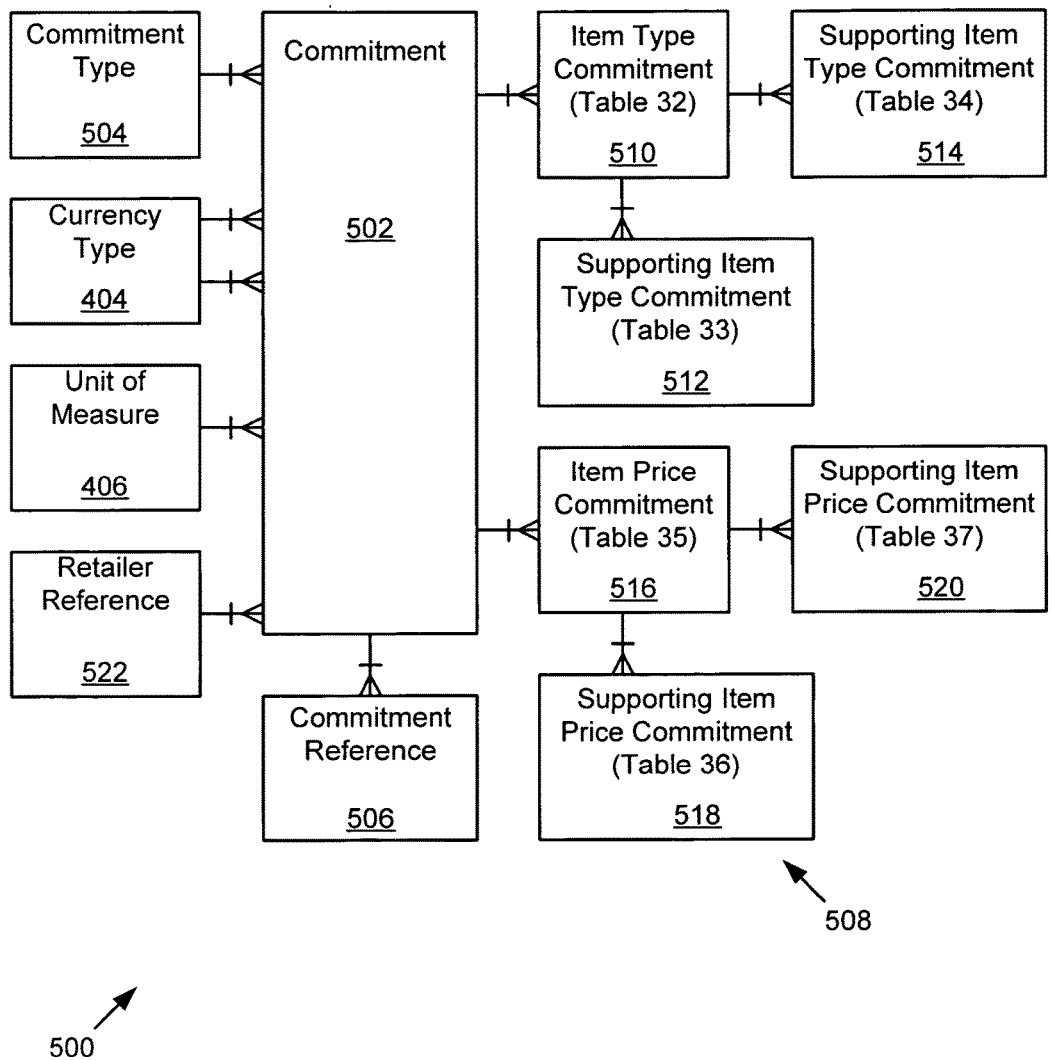
FIG. 5 are examples of commitment definitions.

In FIG. 5, exemplary commitment definitions 500 are present. The commitment definitions 500 may be used to establish a Product Return Commitment, which may be an agreement to return a product within a specified timeframe once disconnection or termination has occurred; a Product Retention Commitment, which may be an agreement to keep a product for a specified timeframe, optionally in exchange for the product at a special price; a Product Purchase Commitment, which may be an agreement to purchase an additional product within a specified timeframe in exchange for a product at a specific price; or another type of commitment.

The commitment definitions 500 may include a commitment definition 502, a commitment type definition 504, and a commitment reference definition 506. The commitment support definitions 508 may provide flexibility in defining any particular type of commitment.

The commitment support definitions 508 may include an item type commitment definition 510, a first item type commitment support definition 512, and a second item type commitment support definition 514. The data processing system 100 may employ the definitions 510-514 to establish and distinguish commitments and support based on item types. The commitment support definitions 508 also may include an item price commitment definition 516, a first item price commitment 520 definition 518, and a second item price commitment support definition 516. The data processing system 100 may employ the definitions 516-520 to establish and distinguish prices associated with commitments. A retailer reference definition 522 also may be present.

The tables below present exemplary database table implementations of the commitment definitions 500.

TABLE 29

| | COMMITMENT_TYPE | | |
|---|---|---|---|
| Key | Column | Content | Type |
| # | COMMITMENT_TYPE_ID | NOT NULL | Numeric |
| | COMMITMENT_TYPE_NAME | NOT NULL | String |
| | COMMITMENT_TYPE_DESC | NOT NULL | String |
| | CREATED_BY | NOT NULL | String |
| | CREATED_DT | NOT NULL | Date |

The COMMITMENT_TYPE_ID field may provide an identifier of an instance of a commitment type definition 504. The COMMITMENT_TYPE_NAME field may provide an alphanumeric name for the commitment type represented by the instance of the definition 504. The COMMITMENT_TYPE_DESC field may provide an alphanumeric descriptor of the commitment type. The commitment type establishes a categorization of the commitment structure. As examples, the types of commitments may include: Commitment to Keep, Commitment to Return, and Commitment to Purchase. The commitment type identifies the kind of obligation which applies to the customer's chosen product-prices (i.e., a specific product at a specific price).

TABLE 30

| | COMMITMENT | | |
|---|---|---|---|
| Key | Column | Content | Type |
| # | COMMITMENT_ID | NOT NULL | Numeric |
| | PC_RET_ID | NOT NULL | Numeric |
| | COMMITMENT_NAME | NOT NULL | String |
| | COMMITMENT_DESC | NOT NULL | String |
| | COMMITMENT_TYPE_ID | NOT NULL | Numeric |
| | COMMITMENT_DURATION | NOT NULL | Numeric |
| | DURATION_UOMMES_ID | NOT NULL | Numeric |
| | COMMITMENT_BEGIN_DT | NOT NULL | Date |
| | IS_PRORATABLE_FLG | NOT NULL | Numeric |
| | IS_ACCUMULATED_FLG | NOT NULL | Numeric |
| | CREATED_BY | NOT NULL | String |
| | CREATED_DT | NOT NULL | Date |
| | MODIFIED_BY | NOT NULL | String |
| | MODIFIED_DT | NOT NULL | Date |
| | PRORATION_METHOD | NULL | Numeric |
| | COMMITMENT_END_DT | NULL | Date |
| | CMTMNT_REAL_VALUE_AMT | NULL | Numeric |
| | REAL_VAL_AMT_CURNCY_ID | NULL | Numeric |

TABLE 30-continued

| | COMMITMENT | | |
|---|---|---|---|
| Key | Column | Content | Type |
| | GRACE_PERIOD_DURATION | NULL | Numeric |
| | GRACE_PERIOD_UOMMES_ID | NULL | Numeric |

The COMMITMENT_ID field may provide an identifier of an instance of a commitment definition 502. The COMMITMENT_NAME field may provide an alphanumeric name for the commitment represented by the instance of the commitment definition 502. The COMMITMENT_DESC field may provide an alphanumeric descriptor of the commitment.

The COMMITMENT_DURATION may provide a numeric value for the length that the commitment will last, while COMMITMENT_UOMMES_ID may provide an identifier for a unit of measure definition that may establish the units of the length (e.g., days, months, or years). The COMMITMENT_BEGIN_DT and COMMITMENT_END_DT may establish the day on which the commitment begins and ends, respectively. The IS_PRORATABLE_FLG field may provide a flag that indicates whether the commitment duration is pro-ratable, and the PRORATION_METHOD field may provide a code that identifies a method for pro-rating the duration.

The IS_ACCUMULATED_FLD field may provide a flag that indicates whether the commitment duration may accumulate over time. The CMTMNT_REAL_VALUE_AMOUNT field may establish a value for the commitment, in a currency identified by the REAL_VALUE_AMT_CURNCY_ID field. The GRACE_PERIOD_DURATION may establish an extent during which no penalties will be assessed for not meeting the commitment duration, while GRACE_PERIOD_UOMMES_ID may establish the unit of measure for the grace period duration.

Instances of Table 30 establish the details of a contract of obligation specifying the minimum amount of time (e.g., 12 months) which a product and price must be held by a customer without the customer incurring penalties.

TABLE 31

| | COMMITMENT_REFERENCE | | |
|---|---|---|---|
| Key | Column | Content | Type |
| # | COMMITMENT_ID | NOT NULL | Numeric |
| # | COMMIT_REF_ID | NOT NULL | String |
| # | DOMAIN_ID | NOT NULL | Numeric |
| | MODIFIED_BY | NOT NULL | String |
| | MODIFIED_DT | NOT NULL | Date |

The COMMIT_REF_ID field may provide an identifier of an instance of the commitment reference definition 506. The DOMAIN_ID field may establish a reference domain for the commitment. The commitment reference provides an identifier which may be used in other system(s) to reference the commitment structure. Each system which uses commitment information may thereby reference the same commitment with a different commitment identifier. For example, if legacy System A and System B use the same Commitment C, both systems may query the system 100 to request data associated with the commitment using the known reference.

TABLE 32

| Key | Column | Content | Type |
|---|---|---|---|
| # | RET_ITMTYP_PRC_CMTMNT_ID | NOT NULL | Numeric |
|   | COMMITMENT_ID | NOT NULL | Numeric |
|   | PC_RET_ID | NOT NULL | Numeric |
|   | PRDTYP_ID | NOT NULL | Numeric |
|   | PRICE_ID | NOT NULL | Numeric |
|   | MODIFIED_BY | NOT NULL | String |
|   | MODIFIED_DT | NOT NULL | Date |

RET_ITMTYP_PRICE_CMTMNT

The RET_ITMTYP_PRC_CMTMNT_ID field may provide an identifier of an instance of the item type commitment definition 510. The PRDTYPE_ID may provide an identifier of an instance of a product type definition 316. Similarly, the PRICE_ID field may provide an identifier of an instance of a price structure definition described in the "Product and Price Determination System" application noted above.

The product type price commitment supports the assignment of a single defined commitment (e.g., 24 months) applicable to all products categorized with the same type (e.g., Equipment) which are also assigned to the same price (e.g., $50.00). Thus, all of the same kind of product offered at the same price may be constrained by a commitment. The product type price commitment provides a benefit to the application administrator as a single 3-way association, product type-price-commitment, which may be applicable to many different products.

TABLE 33

RET_ITTPR_CMTMNT_ITTPR

| Key | Column | Content | Type |
|---|---|---|---|
| # | RET_ITTPR_CMTMNT_ITTPR_ID | NOT NULL | Numeric |
|   | RET_ITMTYP_PRC_CMTMNT_ID | NOT NULL | Numeric |
|   | PC_RET_ID | NOT NULL | Numeric |
|   | MODIFIED_BY | NOT NULL | String |
|   | MODIFIED_DT | NOT NULL | Date |
|   | PRICE_ID | NULL | Numeric |

The RET_ITTPR_CMTMNT_ITTPR_ID field may provide an identifier of an instance of the first item type support definition 512. Table 33 establishes customer commitments to purchase a product of a specific type (e.g., a pay-per-view movie) at whatever price is applicable as a result of buying a committed product-price. For example, a customer may buy Product A for $15.00 (i.e., a product-price of Product A at $15.00) which has a 24 month commitment and a constraint that the customer must also purchase a video event product.

TABLE 34

RET_ITTPR_CMTMNT_ITMPR

| Key | Column | Content | Type |
|---|---|---|---|
| # | RET_ITPR_CMT_ITMPR_ID | NOT NULL | Numeric |
|   | RET_ITMTYP_PRC_CMTMNT_ID | NOT NULL | Numeric |
|   | PRODCT_ID | NOT NULL | Numeric |
|   | PC_RET_ID | NOT NULL | Numeric |
|   | MODIFIED_BY | NOT NULL | String |
|   | MODIFIED_DT | NOT NULL | Date |
|   | PRICE_ID | NULL | Numeric |

The RET_ITTPR_CMT_ITMPR_ID FIELD may provide an identifier of an instance of the second item type support definition 514. The PRODCT_ID field may provide an identifier of an instance of a product definition described above. Table 34 represents a product-price-commitment's committed product-price for situations in which a customer buys a product-price (e.g., Product M for $75.00) bound by a Commitment (e.g., keep for 36 months), but there are one or more specific products (without consideration of price) that have been defined on the commitment that the customer can buy. The associated products may be purchasable only if the customer has the associated product-price-commitment.

TABLE 35

RET_ITM_PRICE_CMTMNT

| Key | Column | Content | Type |
|---|---|---|---|
| # | RET_ITM_PRICE_CMTMNT_ID | NOT NULL | Numeric |
|   | COMMITMENT_ID | NOT NULL | Numeric |
|   | PC_RET_ID | NOT NULL | Numeric |
|   | PRODCT_ID | NOT NULL | Numeric |
|   | PRICE_ID | NOT NULL | Numeric |
|   | MODIFIED_BY | NOT NULL | String |
|   | MODIFIED_DT | NOT NULL | Date |

The RET_ITM_PRICE_CMTMNT_ID field may provide an identifier of an instance of the item price commitment definition 516. Table 35 establishes a product price association (e.g., a basic service for $24.95/moo) which is associated with a commitment structure (which, for example, establishes a commitment of 12 months), where the product when offered at a certain price requires a commitment from the customer.

TABLE 36

RET_ITMPR_CMTMNT_ITMPR

| Key | Column | Content | Type |
|---|---|---|---|
| # | RET_ITPR_CMTMNT_ITPR_ID | NOT NULL | Numeric |
|   | RET_ITM_PRICE_CMTMNT_ID | NOT NULL | Numeric |
|   | PRODCT_ID | NOT NULL | Numeric |
|   | PC_RET_ID | NOT NULL | Numeric |
|   | MODIFIED_BY | NOT NULL | String |
|   | MODIFIED_DT | NOT NULL | Date |
|   | PRICE_ID |  | Numeric |

The RET_ITPR_CMTMNT_ITPR_ID field may provide an identifier of an instance of the first item price support definition 516. Table 36 establishes a product-price-commitment's committed product-price. For example, where the customer buys a product-price (e.g., Product B for $45.00) which is bound by a commitment (e.g., 6 mos), instances of Table 36 may establish one or more specific product-prices defined on the commitment which the customer must also buy (e.g., Product S for $10.00 and Product T for $7.95).

TABLE 37

RET_ITMPR_CMTMNT_ITTYPR

| Key | Column | Content | Type |
|---|---|---|---|
| # | RET_ITMPR_CMT_ITTYPR_ID | NOT NULL | Numeric |
|   | RET_ITM_PRICE_CMTMNT_ID | NOT NULL | Numeric |
|   | PRDTYP_ID | NOT NULL | Numeric |
|   | PC_RET_ID | NOT NULL | Numeric |
|   | MODIFIED_BY | NOT NULL | String |
|   | MODIFIED_DT | NOT NULL | Date |
|   | PRICE_ID | NULL | Numeric |

The RET_ITMPR_CMT_ITTYPR_ID FIELD may provide an identifier of an instance of the second item price support definition 520. Table 37 represents a product price commitment with an additional optionally assigned product type price where a product (e.g., Product X) is assigned to a price (e.g., Price Y) but the product price is only valid with a service commitment (e.g., 1 year) and the customer is obligated to purchase a specific kind of product (i.e., a product type) at a specific price (e.g., $2.99). This table is similar in nature to table 33 which assigns a product type the product price commitment structure. Table 37 establishes a product type price to the product price commitment structure.

TABLE 38

RETAILER_REFERENCE

| Key | Column | Content | Type |
|---|---|---|---|
| # | PC_RET_ID | NOT NULL | Numeric |
|   | RET_REF_ID | NOT NULL | String |
|   | CREATED_BY | NOT NULL | String |
|   | CREATED_DT | NOT NULL | Date |

The RET_REF_ID FIELD may establish a reference identifier for the retailer.

Figure 6:
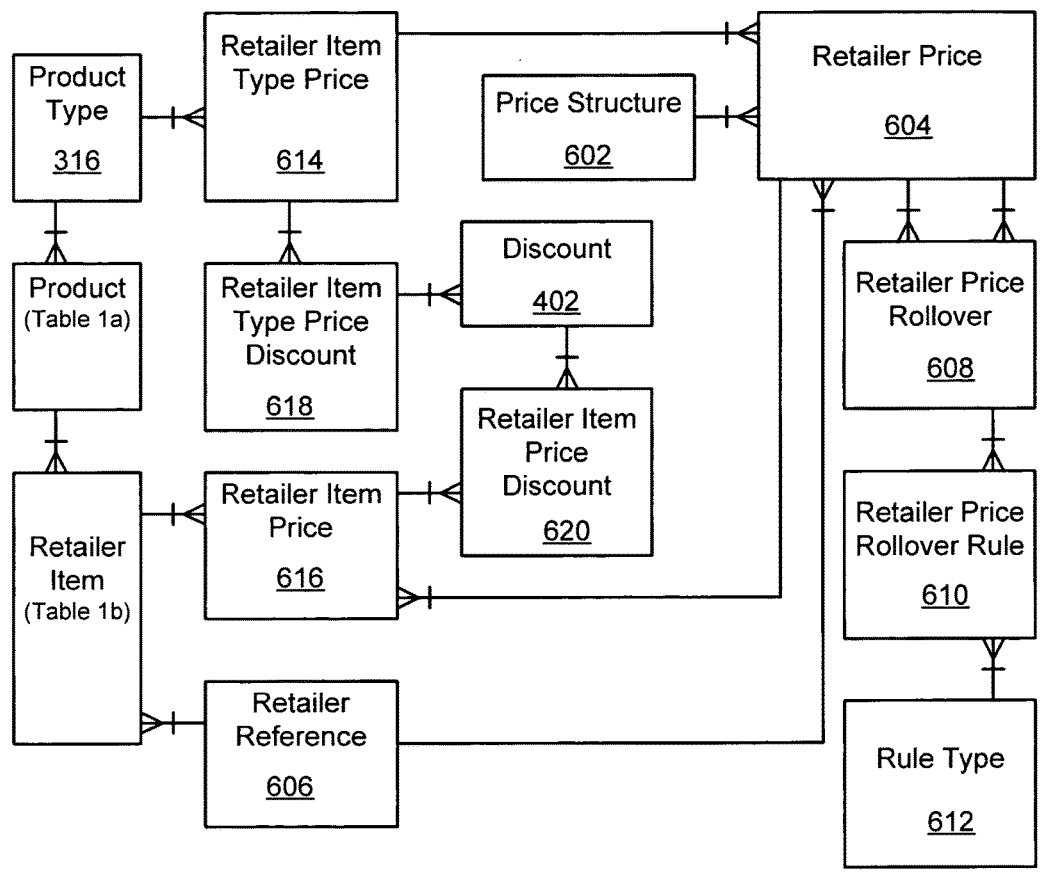
FIG. 6 are examples of price definitions.

In FIG. 6, exemplary price definitions 600 are present. The price definitions 600 may be used to establish flexible pricing options for a product, including prices or discounts based on the type of product, the price of a product, or on other criteria. In addition, the price definitions 600 may establish price rollovers applicable to products.

The price definitions 600 include a price structure definition 602, a retailer price definition 604, and a retailer reference definition 606. Also shown are a retailer price rollover definition 608, a retailer price rollover rule definition 610, and a rule type definition 612. A retailer item type price definition 614 is present, as is a retailer item price definition 616. Discount definitions for the price definitions 614, 616 may also be present, including the retailer item type price discount 618, and the retailer item price discount 620.

The price structure definition 602 may be implemented as shown below.

TABLE 39

PRICE_STRUCTURE

| Key | Column | Content | Type |
|---|---|---|---|
| # | PRICE_ID | NOT NULL | Numeric |
|   | PRICE_NAME | NOT NULL | String |
|   | CURNCY_ID | NOT NULL | Numeric |
|   | PRTYPE_ID | NOT NULL | Numeric |
|   | MODIFIED_BY | NOT NULL | String |
|   | MODIFIED_DT | NOT NULL | Date |
|   | CREATED_BY | NOT NULL | String |
|   | CREATED_DT | NOT NULL | Date |
|   | IS_COMPLETE_FLG | NOT NULL | Numeric |
|   | IS_RECURRING_FLG | NOT NULL | Numeric |
|   | IS_PRORATABLE_FLG | NULL | Numeric |
|   | PRICE_DESC | NOT NULL | String |
|   | PRORATION_METHOD_ID | NULL | Numeric |
|   | PRICE_DURATION | NULL | Numeric |
|   | DURATION_UOMMES_ID | NULL | Numeric |
|   | EFFECTIVE_BEGIN_DT | NOT NULL | Date |
|   | EFFECTIVE_END_DT | NULL | Date |
|   | MANUAL_PRICE_ID | NULL | String |
|   | RECURRING_FREQ | NOT NULL | Numeric |
|   | RECURRING_INTERVAL | NOT NULL | Numeric |
|   | INTERVAL_UOMMES_ID | NOT NULL | Numeric |

TABLE 39-continued

PRICE_STRUCTURE

| Key | Column | Content | Type |
|---|---|---|---|
|   | CHARGERATE_UOMMES_ID | NOT NULL | Numeric |
|   | GRANDFATHER_PERIOD | NULL | Numeric |
|   | GRANDFATHER_UOMMES_ID | NULL | Numeric |

The PRICE_ID field may provide a primary key identifier of an instance of the price structure table. Many price structures, distinguished by their PRICE_ID field, may be defined in the data processing system 100 and may be associated with one or more product definitions 122. The PRICE_NAME field may provide an alphanumeric descriptor for the price structure.

The CURNCY_ID field may provide a numeric code that indicates the type of currency (e.g., dollars) that applies to the price structure. The PRTYPE_ID field may provide an identifier of a price type.

The IS_COMPLETE_FLG field may provide a flag that indicates whether selected price structure fields have been completed, or that the price structure instance meets any other pre-determined criteria before the price structure instance is available for use. The IS_RECURRING_FLG field may provide a flag that indicates whether the price structure instance represents a recurring price (e.g., once a month), or is a one-time price. The IS_PRORATABLE_FLG field may provide a flag that indicates whether the product price is pro-ratable.

The PRICE_DESC field may provide an alphanumeric descriptor for the price, including a description of how or when the price applies, for example. The PRORATION_METHOD_ID field may provide a numeric indicator of a type of pro-rating that may apply to the price (e.g., weekly or daily). The PRICE_DURATION field may provide a numeric code that may specify how long the price is available. The DURATION_UOMMES_ID field may provide a numeric code that may specify the Unit of Measure (UOM) (e.g., hours or days) that may apply to the duration.

The EFFECTIVE_BEGIN_DT field may provide a date on which the price structure may begin to apply to an associated product. The EFFECTIVE_END_DT field may provide a date after which the price structure no longer applies to an associated product. The MANUAL_PRICE_ID field may establish a price identifier, for example for a manually entered price.

The RECURRING_FREQ field may provide a numeric code that indicates how frequently (e.g., every three months) the pricing established by the price structure may apply to an associated product. The RECURRING_INTERVAL field may provide a numeric code that indicates, when the pricing applies, the time between offerings of the pricing (e.g., once every 10 days). The INTERVAL_UOMMES_ID field may provide a numeric code that may specify the Unit of Measure (UOM) (e.g., hours or days) that may apply to the interval.

The CHARGERATE_UOMMES_ID field may provide a numeric code that may specify the Unit of Measure (UOM) (e.g., days or months) that may apply to the rate at which the price is charged to the customer. The GRANDFATHER_PERIOD field may provide a numeric code that may specify a period during which a prior purchaser may continue to receive the pricing established by the price structure, after the pricing is no longer available. The GRANDFATHER_UOMMES_ID field may provide a numeric code that may specify the Unit of Measure (UOM) (e.g., months or years) that may apply to the grandfather period.

The retailer price definition 604 may be implemented as shown below and may establish a display rank for the associated price.

TABLE 40

RETAILER_PRICE

| Key | Column | Content | Type |
|---|---|---|---|
| # | PRICE_ID | NOT NULL | Numeric |
|  | PC_RET_ID | NOT NULL | Numeric |
|  | MODIFIED_BY | NOT NULL | String |
|  | MODIFIED_DT | NOT NULL | Date |
|  | DISPLAY_RANK | NULL | Numeric |

The retailer reference definition 606 may be implemented as shown below and may establish a display rank for the associated price.

TABLE 41

RETAILER_REFERENCE

| Key | Column | Content | Type |
|---|---|---|---|
| # | PC_RET_ID | NOT NULL | Numeric |
|  | RET_REF_ID | NOT NULL | String |
|  | CREATED_BY | NOT NULL | String |
|  | CREATED_DT | NOT NULL | Date |

The RET_REF_ID field may provide an identifier of an instance of the retailer reference definition 606.

The retailer price rollover definition 608 may be implemented as shown below and may establish a rollover type or definition for a retailer price.

TABLE 42

RETAILER_PRICE_ROLL_OVER

| Key | Column | Content | Type |
|---|---|---|---|
| # | PRICE_ID | NOT NULL | Numeric |
| # | ROLLOVER_PRICE_ID | NOT NULL | Numeric |
| # | PC_RET_ID | NOT NULL | Numeric |
|  | MODIFIED_BY | NOT NULL | String |
|  | MODIFIED_DT | NOT NULL | Date |

The ROLLOVER_PRICE_ID field may provide an identifier of an instance of the retailer price rollover definition 608.

The retailer price rollover rule definition 610 may be implemented as shown below and may establish a rule that determines how a price may be rolled over.

TABLE 43

RETAILER_PRICE_ROLLOVER_RULE

| Key | Column | Content | Type |
|---|---|---|---|
| # | PRICE_ID | NOT NULL | Numeric |
| # | PC_RET_ID | NOT NULL | Numeric |
| # | ROLLOVER_PRICE_ID | NOT NULL | Numeric |
| # | RULTYP_ID | NOT NULL | Numeric |
| # | RULE_NAME | NOT NULL | String |
|  | MODIFIED_BY | NOT NULL | String |
|  | MODIFIED_DT | NOT NULL | Date |
|  | PRIORITY | NULL | String |

TABLE 43-continued

RETAILER_PRICE_ROLLOVER_RULE

| Key | Column | Content | Type |
|---|---|---|---|
|  | EFFECTIVE_BEGIN_DT | NOT NULL | Date |
|  | EFFECTIVE_END_DT | NULL | Date |

The RULTYP_ID field may provide an identifier of an instance of a rule type definition 612. The RULE_NAME field may provide an alphanumeric name for a rollover rule. The PRIORITY field may provide a code that indicates an ordering or sequence for application of the rule. For example, higher priority rules may be applied before lower priority rules.

The rule type definition 612 may be implemented as shown below and may establish a name and description for a rule.

TABLE 44

RULE_TYPE

| Key | Column | Content | Type |
|---|---|---|---|
| # | RULTYP_ID | NOT NULL | Numeric |
|  | TYPE_NAME | NOT NULL | String |
|  | TYPE_DESC100 | NOT NULL | String |
|  | CREATED_BY | NOT NULL | String |
|  | CREATED_DT | NOT NULL | Date |

The TYPE_NAME field may provide an alphanumeric name for the associated rule type, while the TYPE_DESC100 field may provide an alphanumeric descriptor for the rule type.

The retailer item type price definition 614 may be implemented as shown below and may establish a price for a product based on the type of the product.

TABLE 45

RETAILER_ITEM_TYPE_PRICE

| Key | Column | Content | Type |
|---|---|---|---|
| # | PRDTYP_ID | NOT NULL | Numeric |
| # | PRICE_ID | NOT NULL | Numeric |
| # | PC_RET_ID | NOT NULL | Numeric |
|  | MODIFIED_BY | NOT NULL | String |
|  | MODIFIED_DT | NOT NULL | Date |
|  | PRODUCT_OPTIMIZATION_RANK | NULL | Numeric |

The PRODUCT_OPTIMIZATION_RANK field may provide an identifier that indicates the rank, importance, or priority of application of the retailer price to a product.

The retailer item price definition 616 may be implemented as shown below and may establish the price for a product.

TABLE 46

RETAILER_ITEM_PRICE

| Key | Column | Content | Type |
|---|---|---|---|
| # | PRODCT_ID | NOT NULL | Numeric |
| # | PRICE_ID | NOT NULL | Numeric |
| # | PC_RET_ID | NOT NULL | Numeric |
|  | MODIFIED_BY | NOT NULL | String |
|  | MODIFIED_DT | NOT NULL | Date |
|  | PRODUCT_OPTIMIZATION_RANK | NULL | Numeric |

TABLE 46-continued

RETAILER_ITEM_PRICE

| Key | Column | Content | Type |
|---|---|---|---|
|  | BILL_DELAY_DUR_UOMMES_ID | NULL | Numeric |
|  | BILL_DELAY_DURATION | NULL | Numeric |
|  | BILL_DELAY_UNTIL_DATE | NULL | Date |

The BILL_DELAY_DUR_DURATION field may provide a code that indicates the length of time the service provider may forgo sending a bill for a product to a customer. The BILL_DELAY_DUR_UOMMES_ID field may provide a code that establishes a unit of measure for the bill delay duration. The BILL_DELAY_UNTIL_DATE may provide a date until which the bill may be delayed.

The retailer item type price discount definition 618 may be implemented as shown below and may establish a discount for a product based on the type of the product.

TABLE 47

RETAILER_ITMTYP_PRICE_DSCNT

| Key | Column | Content | Type |
|---|---|---|---|
| # | PDTYDS_ID | NOT NULL | Numeric |
|  | PRDTYP_ID | NOT NULL | Numeric |
|  | PRICE_ID | NOT NULL | Numeric |
|  | DISCNT_ID | NOT NULL | Numeric |
|  | PC_RET_ID | NOT NULL | Numeric |
|  | MODIFIED_BY | NOT NULL | String |
|  | MODIFIED_DT | NOT NULL | Date |
|  | PRODUCT_TYPE_COUNT | NULL | String |
|  | DISCOUNT_RANK | NULL | Numeric |

The PDTYDS_ID field may provide an identifier of an instance of the retailer item type price discount definition 618. The PRODUCT_TYPE_COUNT field may provide a count of the number of products or product types associated with a discount. The DISCOUNT_RANK field may provide an identifier of a rank or priority of application of the discount.

The retailer item price discount definition 620 may be implemented as shown below and may establish a discount for a product based on the price of the product.

TABLE 48

RETAILER_ITEM_PRICE_DSCNT

| Key | Column | Content | Type |
|---|---|---|---|
| # | RTPRDS_ID | NOT NULL | Numeric |
|  | PRODCT_ID | NOT NULL | Numeric |
|  | PRICE_ID | NOT NULL | Numeric |
|  | DISCNT_ID | NOT NULL | Numeric |
|  | PC_RET_ID | NOT NULL | Numeric |
|  | MODIFIED_BY | NOT NULL | String |
|  | MODIFIED_DT | NOT NULL | Date |
|  | DISCOUNT_RANK | NULL | Numeric |

The RTPRDS_ID field may provide an identifier of an instance of the retailer item price discount definition 620.

Figure 7:
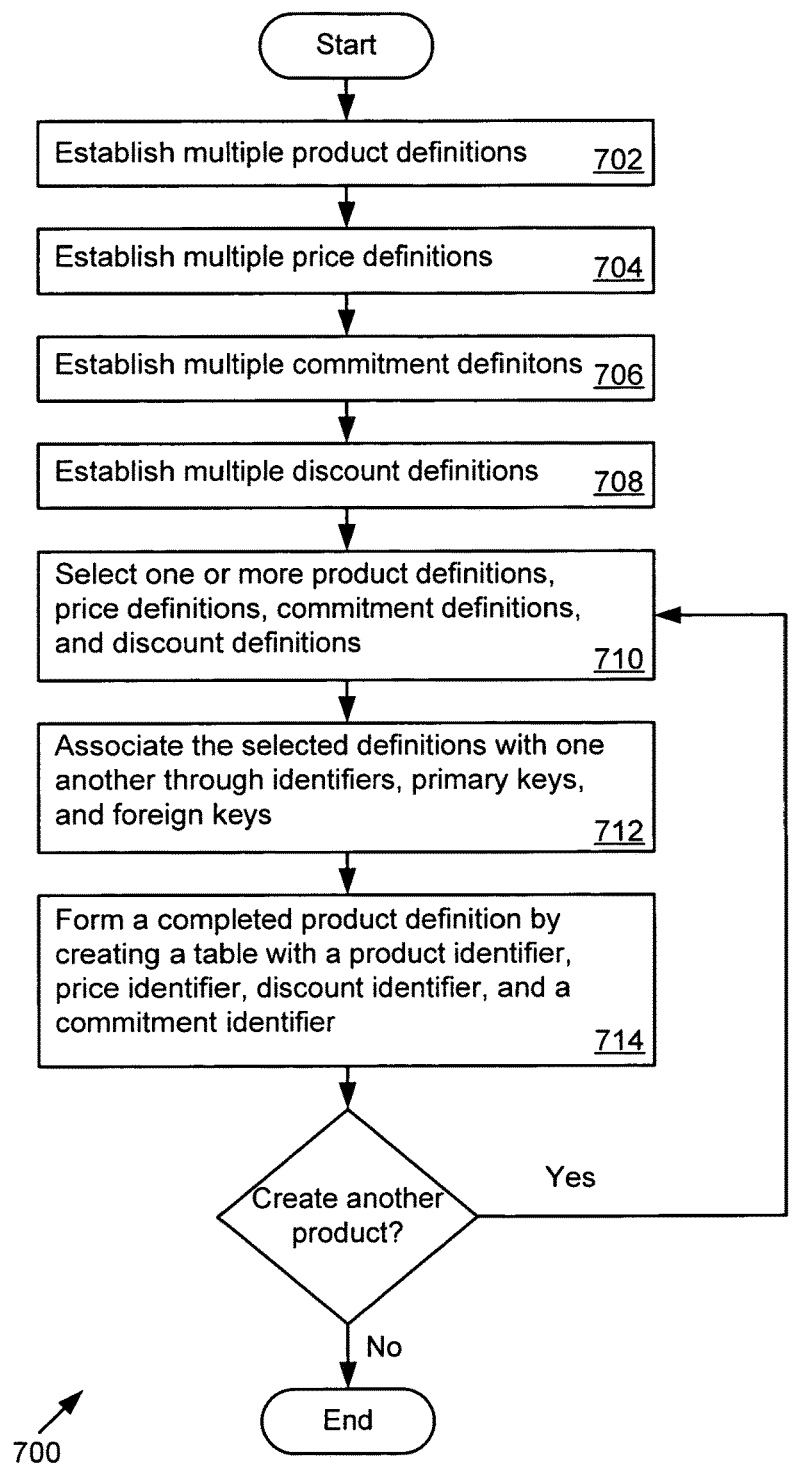
FIG. 7 is an example of the acts that may be taken by a data processing system to establish products that may be offered by a service provider.

FIG. 7 shows an example of the acts that may be taken by the data processing system 100 to establish completed products that may be offered by a service provider. The data processing system 100 may establish one or more product definitions 300 (Act 702), price definitions 600 (Act 704), commitment definitions 500 (Act 706), and discount definitions 400 (Act 708). The service provider may then select one or more of the definitions to include in a completed product (Act 710).

The service provider may then associate the selected definitions with one another (Act 712). The selected definitions may be associated through common identifier fields, primary keys, foreign keys, and composite keys. For example, an instance of the retailer item price discount definition 620 may be associated with an instance of a discount definition 402 by establishing the same identifier in the DISCNT_ID field of both instances.

Any combination of a discount identifier (DISCNT_ID), price identifier (PRICE_ID), commitment identifier (COMMITMENT_ID), and product identifier (PRODCT_ID) may then be associated to form a completed product definition. For example, one or more of the identifiers may be stored in a table such as an association table 202 (Act 714). The service provider may employ the definitions discussed above as re-usable building blocks to form as many products as desired with as many common definitions between completed products as desired.

The data processing system 100 provides a highly configurable, flexible, and extensible product definition system that may be employed by many service providers in many industries to define product available to their customers. Each service provider may tailor the product, price, commitment, and discount definitions to apply across a significant range of different products. The service provider may more easily and more efficiently develop, modify, and apply sophisticated processing designs, without the time and expense associated with obtaining custom software solutions.

It is therefore intended that the foregoing detailed description be regarded as illustrative rather than limiting, and that it be understood that it is the following claims, including all equivalents, that are intended to define the spirit and scope of this invention.

The invention claimed is:
1. A method, comprising:
creating by a system within a first hardware database of the system a plurality of reusable definitions applicable to a plurality of products, the reusable definitions including:
a plurality of product definitions including descriptions of a unique identifier of a product, an alphanumeric descriptor of the product, a date and time from when a customer request for the product can be taken, an indication as to whether a customer may purchase multiple units of the product, and a period of time after the product expires during which the customer may continue to have the product,
a plurality of price definitions including descriptions of a type of applicable currency, an indication as to whether a price for the product is a recurring or one-time price, and a duration during which the price is available for the product,
a plurality of discount definitions including descriptions of a discount that applies to a price of the product, a discount that is applied to a price of a type of product, and a discount that applies to a price of a total bill of the customer, and
a plurality of commitment definitions including descriptions of an agreement to return the product within a specified timeframe once one or more of a disconnection and termination event have occurred, and an agreement to keep the product for a specified timeframe;
creating by the system within a second hardware database of the system a plurality of complete definitions for specific products of the plurality of products, including for each of the specific products of the plurality of products:
identifying by the system a selection of definitions from the plurality of reusable definitions, the selection of definitions comprising one definition from each of: the plurality of product definitions, the plurality of price definitions, the plurality of discount definitions, and the plurality of commitment definitions,
creating in the second hardware database an association table corresponding to the specific product for storing the complete definition for the specific product,
storing the complete definition for the specific product in the association table corresponding to the specific product by storing in the association table a reference to each of the selected definitions in the first hardware database;
making the specific products of the plurality of products available to customers, using the complete definitions for the specific products of the plurality of products;
wherein at least two of the complete definitions include a reference to a same one of the re-usable definitions, and wherein the one of the re-usable definitions is tailored to apply across the at least two of the complete definitions.

2. The method of claim 1, wherein a separate association table is created for each of the specific products of the plurality of products.

3. A system, comprising:
a processor for:
creating by the system within a first hardware database of the system a plurality of reusable definitions applicable to a plurality of products, the reusable definitions including:
a plurality of product definitions including descriptions of a unique identifier of a product, an alphanumeric descriptor of the product, a date and time from when a customer request for the product can be taken, an indication as to whether the customer may purchase multiple units of the product, and a period of time after the product expires during which the customer may continue to have the product,
a plurality of price definitions including descriptions of a type of applicable currency, an indication as to whether a price for the product is a recurring or one-time price, and a duration during which the price is available for the product,
a plurality of discount definitions including descriptions of a discount that applies to a price of the product, a discount that is applied to a price of a type of product, and a discount that applies to a price of a total bill of the customer, and
a plurality of commitment definitions including descriptions of an agreement to return the product within a specified timeframe once one or more of a disconnection and termination event have occurred, and an agreement to keep the product for a specified timeframe;
creating by the system within a second hardware database of the system a plurality of complete definitions for specific products of the plurality of products, including for each of the specific products of the plurality of products:
identifying by the system a selection of definitions from the plurality of reusable definitions, the selection of definitions comprising one definition from each of: the plurality of product definitions, the plurality of price definitions, the plurality of discount definitions, and the plurality of commitment definitions,
creating in the second hardware database an association table corresponding to the specific product for storing the complete definition for the specific product,
storing the complete definition for the specific product in the association table corresponding to the specific product by storing in the association table a reference to each of the selected definitions in the first hardware database;
making the specific products of the plurality of products available to customers, using the complete definitions for the specific products of the plurality of products;
wherein at least two of the complete definitions include a reference to a same one of the re-usable definitions, and wherein the one of the re-usable definitions is tailored to apply across the at least two of the complete definitions.

4. A non-transitory machine readable medium comprising instructions that when executed by a processor in a data processing system, cause the processor to perform a method comprising:
creating by the system within a first hardware database of the system a plurality of reusable definitions applicable to a plurality of products, the reusable definitions including:
a plurality of product definitions including descriptions of a unique identifier of a product, an alphanumeric descriptor of the product, a date and time from when a customer request for the product can be taken, an indication as to whether the customer may purchase multiple units of the product, and a period of time after the product expires during which the customer may continue to have the product,
a plurality of price definitions including descriptions of a type of applicable currency, an indication as to whether a price for the product is a recurring or one-time price, and a duration during which the price is available for the product,
a plurality of discount definitions including descriptions of a discount that applies to a price of the product, a discount that is applied to a price of a type of product, and a discount that applies to a price of a total bill of the customer,
a plurality of commitment definitions including descriptions of an agreement to return the product within a specified timeframe once one or more of a disconnection and termination event have occurred, and an agreement to keep the product for a specified timeframe;
creating by the system within a second hardware database of the system a plurality of complete definitions for specific products of the plurality of products, including for each of the specific products of the plurality of products:
identifying by the system a selection of definitions from the plurality of reusable definitions, the selection of definitions comprising one definition from each of: the plurality of product definitions, the plurality of price definitions, the plurality of discount definitions, and the plurality of commitment definitions,
creating in the second hardware database an association table corresponding to the specific product for storing the complete definition for the specific product,
storing the complete definition for the specific product in the association table corresponding to the specific product by storing in the association table a reference to each of the selected definitions in the first hardware database;

making the specific products of the plurality of products available to customers, using the complete definitions for the specific products of the plurality of products;

wherein at least two of the complete definitions include a reference to a same one of the re-usable definitions, and wherein the one of the re-usable definitions is tailored to apply across the at least two of the complete definitions.

* * * * *